Oct. 19, 1943.   S. C. CARNEY   2,332,057
APPARATUS FOR AGGLOMERATING COMMERCIAL CARBON BLACK
Original Filed Feb. 28, 1939   4 Sheets-Sheet 3

INVENTOR
S. C. CARNEY
BY
Hudson, Young and Yinger
ATTORNEY

Patented Oct. 19, 1943

2,332,057

UNITED STATES PATENT OFFICE 2,332,057

APPARATUS FOR AGGLOMERATING COMMERCIAL CARBON BLACK

Samuel C. Carney, Bartlesville, Okla., assignor to Phillips Petroleum Company, a corporation of Delaware Original application February 28, 1939, Serial No. 259,065. Divided and this application June 12, 1942, Serial No. 446,761

5 Claims. (Cl. 259—3)

This invention relates to carbon black and more particularly it relates to an apparatus for transforming light, dusty carbon black as produced, into free flowing, relatively dustless, small aggregates of density 20 pounds or more per cubic foot. The process for agglomerating carbon black using this apparatus is fully described in my issued Patent No. 2,311,154, of which this application is a division.

An object of this invention is to provide an apparatus for the granulating or pelleting of flocculent carbon black, the process of which is disclosed in the above said issued patent.

The known art includes both "wet" and "dry" processes. In the wet processes, the black is wetted by one or more liquids, which in commercial practice, is really confined to the use of water. Water so used is for the purpose of promoting the agglomeration and it is always removed later by known drying processes.

It is an advantage of this and other "dry" processes over the wet ones that the two separate operations of adding and removing the water are eliminated, together with the change in characteristics of the black due to wetting and subsequent drying at a temperature somewhat elevated. Also, the wet black is quite corrosive to equipment metals, even to stainless steel, which is used in the wet processes, and the dry black is very slightly, if at all, corrosive to ordinary steel which is used in the dry processes.

The advantage of the herein disclosed dry process apparatus over the apparatus commercially used, such as that disclosed in U. S. Patents Nos. 2,120,540, 2,120,541, 2,102,054, 2,127,137, and Reissue No. 19,750, lies in less expensive equipment, less power requirements, more positive and certain control of operation and a finished product substantially free of dust and of relatively high density. The apparatus is well adapted to continuous operation.

Figure 1:
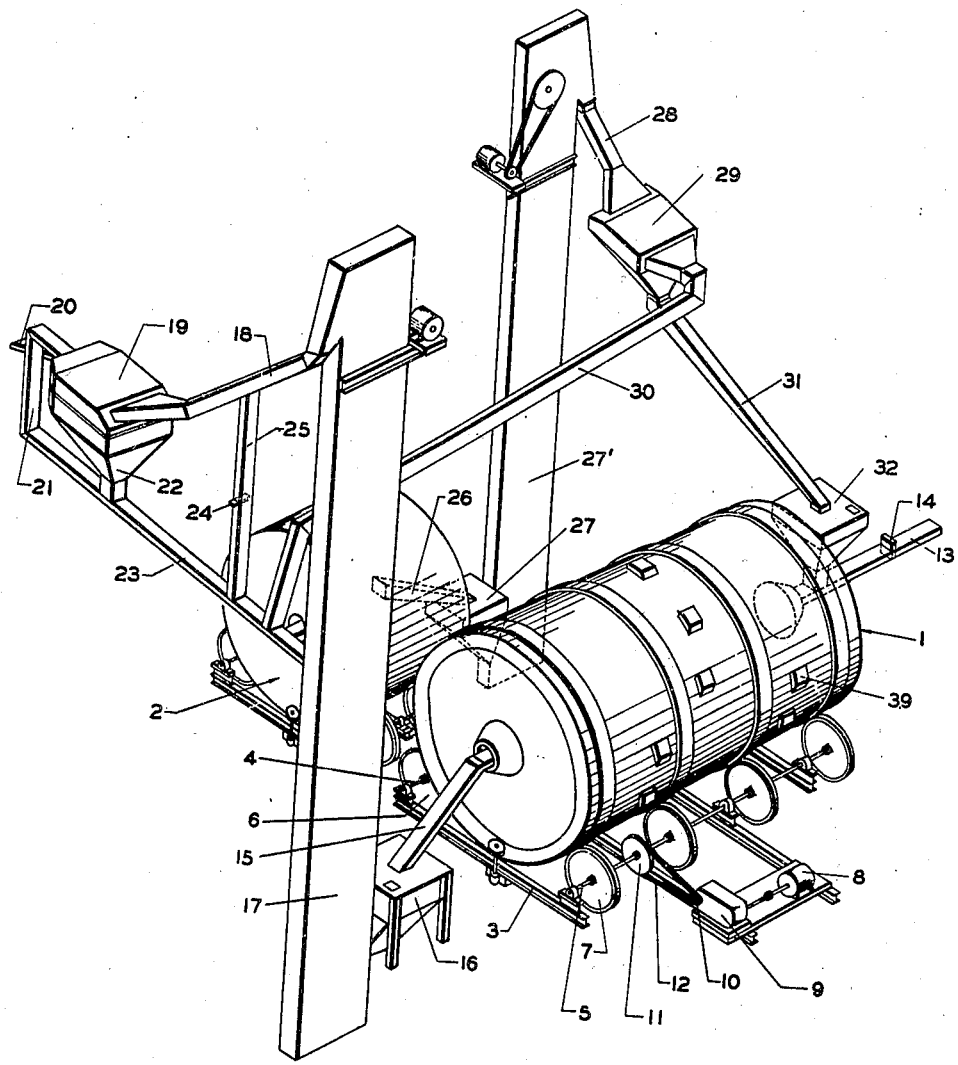
Figure 2:
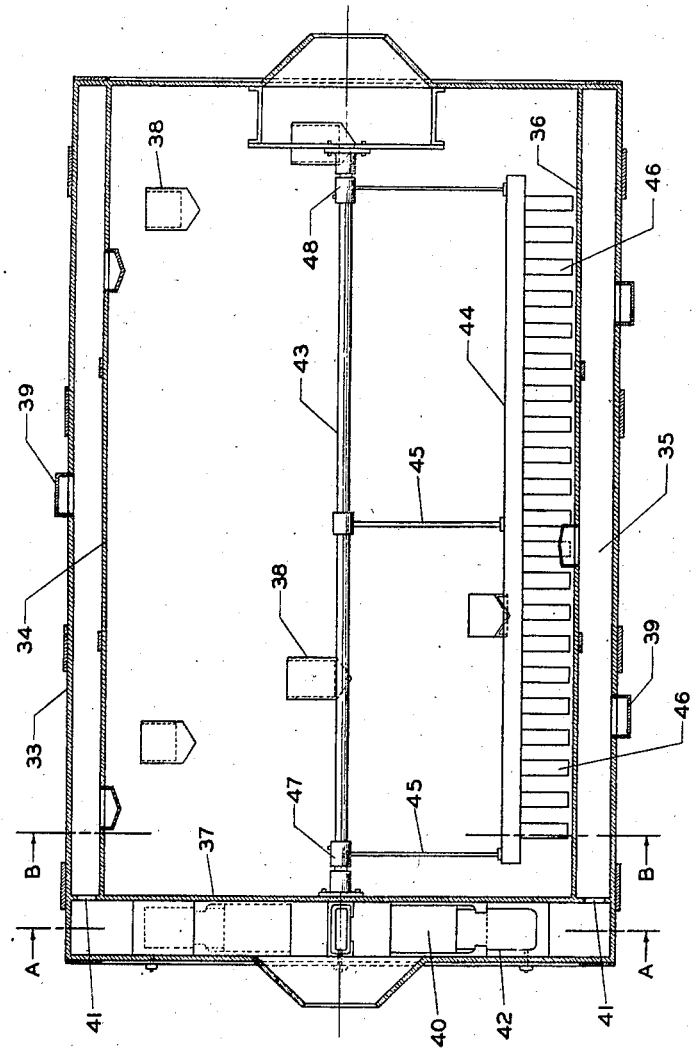
Figure 3:
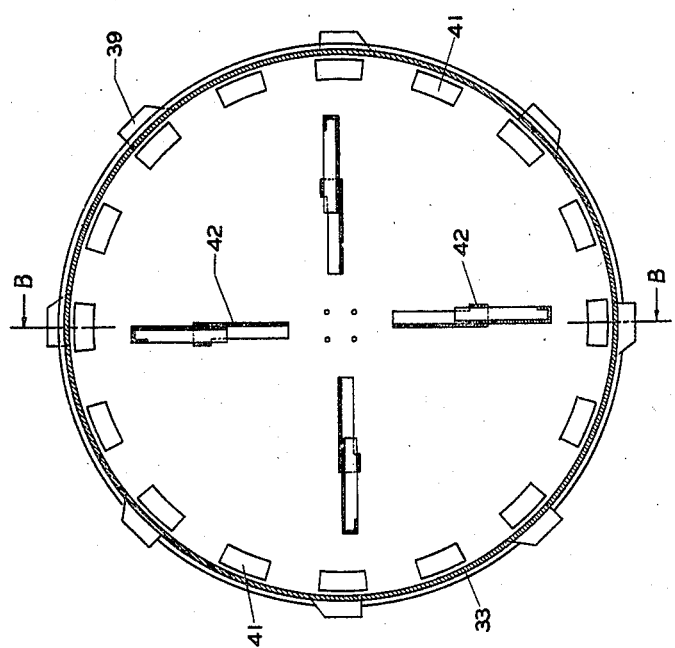

In the accompanying drawings, forming a part of this specification, and in which like numerals are employed to designate like parts throughout the same, Figure 1 is an isometric view of the entire carbon black agglomerating plant set-up, Figure 2 is a longitudinal, vertical sectional view through the center of the granulator taken on the line B—B of Figure 3.

Figure 4:
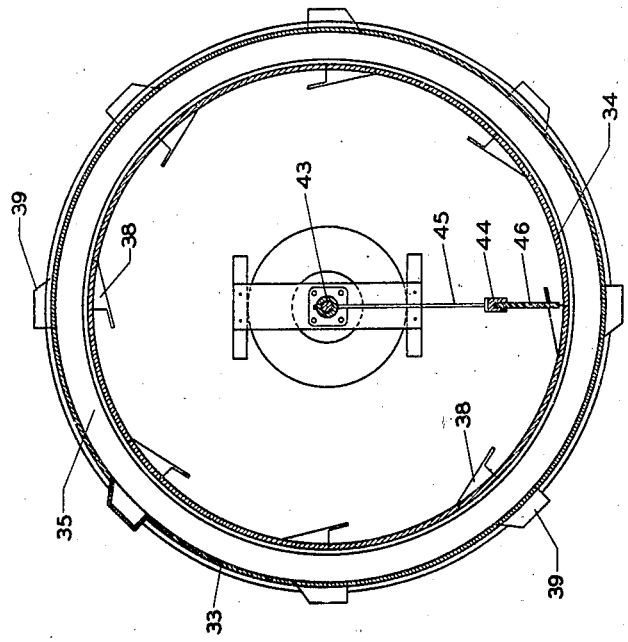
Figure 5:
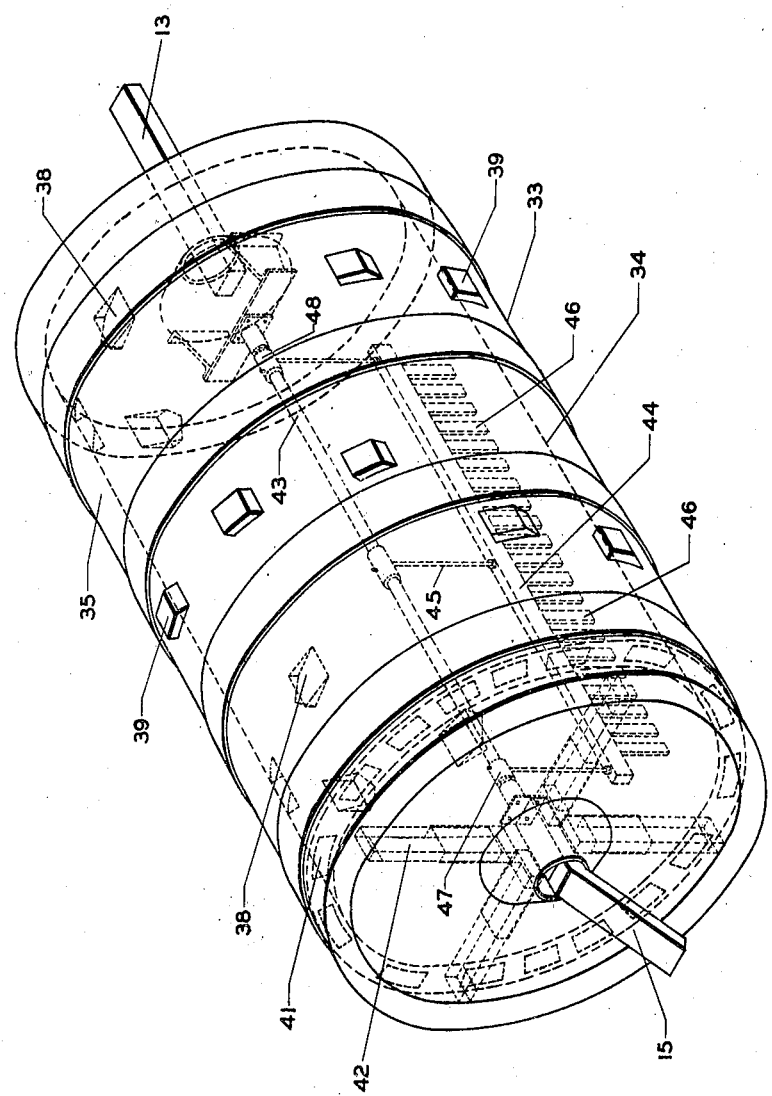

Figure 3 is a cross sectional view of the granulator taken on the line A—A of Figure 2, Figure 4 is a cross sectional view of the granulator taken on the line B—B of Figure 2, Figure 5 is an isometric view of the granulator.

In the drawings, wherein for purposes of illustration, is shown an embodiment of the apparatus for carrying forward the process of my invention, 1 represents the granulator and 2 is the seed mill, both being rotating devices mounted on trunnions of known types and being independently driven by separate motors through reduction gears also of known type. Their speed of rotation may be adjusted by the operator (though this is no part of the invention) and will lie in the range between 4 and 25 R. P. M. Since the rotating mechanism for the granulator 1 and seed mill 2 are identical except for size, only the mechanism for the granulator 1 will be discussed. A supporting member 3 carries a shaft 4 on one end thereof and a shaft 5 on the other end. Mounted on the shafts 4 and 5 to rotate therewith are a series of rollers 6 and 7. The granulator 1 rests on the rollers 6 and 7, and by frictional contact between the rollers and granulator, the granulator is made to rotate when the rollers are actuated by the shaft. A motor 8 and variable speed reducer 9 are mounted on an extension of the support 3 and are connected together. A gear 10 on the variable speed reducer 9 connects with a gear 11 keyed to the shaft 5 by means of the sprocket chain 12 and in this manner rotates the shaft 5 which in turn rotates the rollers 7.

Raw feed, being the carbon black plant product after the conventional treatment for removal of grit, and without any treatment for increase of its density, enters granulator 1 through closed conveyor 13 and a valve 14 in the conveyor 13 controls flow therethrough. The feed end of the granulator 1 is elevated to cause flow of material through it and the agglomerates made within it leave the other end of the mill by the gravity chute 15 which chute delivers the agglomerates to the hopper 16 from whence they go to the bucket elevator 17. Elevator 17 lifts the mixture of aggregates to the top of the elevator 17 where they pass by closed conduit 18 to duplex sifter 19. The sifter 19 separates the material into three fractions: (1) Those larger than the size selected as maximum product size; (2) The finished product; and, (3) Those smaller than the size selected as minimum product size.

Of these, the finished product moves by conveyor pipe 20 to storage. The oversize product leaves the top of the sifter by conveyor pipe 21, the undersize leaves the bottom of the sifter by conduit 22 and both the oversize and undersize flow join in conveyor 23 where they go together through conveyor pipe 23 to the feed entrance of seed mill 2. As manually controlled by the operator, slide valve 24 may, especially on starting, admit to pipe 23 from pipe 18 through conveyor 25 a further supply of the agglomerated carbon black, but before the material has passed through the sifter 19 and if this be used, the material so by-passed also enters the seed mill through the conveyor 23.

In seed mill 2 all material fed to it is subjected to a controlled combination of attrition and agglomeration as will be described under operation and the material after this treatment leaves by chute 26 flowing into hopper 27 where it goes into the base of elevator 27'. From the top of elevator 27', the material flows through conveyor 28 to a sifter 29 where it is separated into two fractions. That part which is coarser than the size selected as the maximum seed size flows through conveyor 30 back to conveyor 23 being thus returned to the seed mill 2 for further treatment. The seed size as selected by sifter 29 flows through conveyor 31 into hopper 32 where it is fed into the granulator 1 along with the raw feed coming through line 13.

All conveyors, sifters, elevators, and the mechanical driving mechanism are known commercial devices and are no part of the invention.

Having by reference to Figure 1 described the flow sheet, reference is now had to Figures 2–5 for description of the details of the granulator 1 and the seed mill 2 which except for dimensions, are identical, the seed mill having from ¼ to ½ the cubic capacity for material in process of the granulator. In Figure 5 feed line 13 and product line 15 are the lines 13 and 15 of Figure 1 or they may equally represent lines 23 and 26 of the seed mill while the cylindrical body of Figure 5 may equally represent both mills 1 and 2 of Figure 1.

The cylindrical body of mills 1 and 2 comprises two cylinders 33 and 34 and in this use of the mill 1, the external cylinder is about 8 feet in diameter and the internal one about 7 feet in diameter and the description chiefly relates to the annulus 35 between the inner and outer cylinders and to the means of delivering material into this annulus and removing it therefrom.

Material entering by line 13 falls to the inner surface 36 of the inner cylinder. This cylinder by its slope towards the discharge end and by its rotation acts as a conveyor which distributes such material throughout its length until it reaches the longitudinal partition 37 as shown also in Figure 2. This partition 37 marks the end of the inner cylinder and of course of the annulus. Within the inner cylinder 34 are arranged helically, dippers 38 which communicate with and cover openings cut in the inner cylinder. These dippers 38 are also shown in cross section in Figure 2 and are so arranged with reference to the direction of rotation that they dip up the material fed to the machine and deliver it into the annulus.

In the outer cylinder are arranged, also in a helical manner, cups 39 which completely cover openings of similar size cut in the wall of that cylinder. These cups 39 are also shown in cross section in Figure 2 and in Figure 5. The existence of dippers 38 and cups 39 is a part of the invention, but their exact size and arrangement are matters of engineering. The dippers 38 should be of such size and number and so arranged as to be substantially oversize for the duty of delivering all material fed to the annulus in a uniform manner. The size and number of cups 39 should be such as to turn over the material in process by moving it from bottom to top position in the annulus in from 10 to 40 revolutions.

Partition 37, marking the length of the inner cylinder, is so located that the outer cylinder is from 5 to 15% longer than the inner one. This provides the non-feeding zone shown at 40 in Figure 2, and in Figure 3 which is the section A—A of Figure 2 which is bounded only by the outer cylinder and its head and by partition 37. This non-feeding section is also provided with cups 39 which continuously move material from the bottom to top position. That annular part of partition 37 which covers the discharge end of the annulus 35 between the inner and outer cylinders 34 and 33 is provided with numerous large slotted openings 41, any one of which is large enough to permit the flow through it of the granules produced in the annulus. Granules flow through such openings 41 as are uncovered into the nonfeed zone 40. This non-feed zone 40 of 5 to 15% of the total length, has in principle such a length calculated on the granules maintained within it that granules there rotated will remain long enough for all amorphous material to be absorbed upon them and not so long as to roughen their surface by attrition. This is from about 50 revolutions to about 150.

The length of residence in the non-feed zone is adjusted by means of the dipping spouts 42 which are shown in Figures 2, 3, and 5. These are open topped spouts with a closed radial end and open central end. They are made in telescoping sections and are adjusted as to length from outside the machine when it is not rotating. They dip into the material in the non-feed zone and as the machine rotates they deliver the granular material into discharge spout 15 located at their common center. Shortening their length will clearly raise the level of material held in the zone and vice versa.

The angle of repose of the granular material is substantially 35 degrees. Material in the non-feed zone will therefore cover such openings 41 as are at the bottom of the rotating cylinder and, depending on the level of material held there, will cover several openings 41 on the ascending half of the annulus. By properly relating the level of material in this non-feed zone with the angle of slope given, the entire machine, time of residence in the non-feed zone and the upper level of granular material held in the delivery end of the annulus are controlled by covering or uncovering more openings 41.

To prevent excessive adherence to the surface 36 of the inner cylinder, which will happen with some kinds of carbon black, an internal scraping mechanism is provided. From the stationary internal shaft 43 there is suspended the bar 44 by hangers 45 which are attached to shaft 43 and bar 44. To bar 44 are attached a large number of suitable rubber members 46 designed to have a scratching action on the entire inner surface 36 as it passes beneath them. The weight of the bar 44 with that of members 45 and 46, holds the entire assembly stationary suspended from bearings 47 and 48. In many cases this entire scraping device may be omitted from the "seed mill" 2 and in some cases, especially when a rubber lining or other material to which carbon does not adhere is used in construction, it may be omitted in both cases without affecting the invention.

Operation of the apparatus as herein disclosed must start with the vitally necessary charge of high density agglomerated material, for the apparatus as thus far mechanically described, is entirely inoperative for the purpose. Where the processes of the prior art had ingeniously contrived mechanical devices for stirring and governing the motion of the material, in this process, the effective mechanism is the granules of carbon which it itself produces. The cylindrical annulus is but a moving container in which carbon black demonstrates its natural inherent property of agglomeration, its motion being governed by the laws of mathematics.

In actual practice, my equipment is charged up to the operating level of each mill with any kind of commercial agglomerated black now on the market, even with the much larger pellets made by a mechanical wet process, the mills are started to rotate and raw feed is introduced. With the riddles in the sifters being of the mesh for the product and seed desired, after a few hour's operation the original charge is replaced with one pertaining to this process. This active charge which is the mechanism of the process, remains in the respective machines, being continuously renewed and replaced by other similar material so that it never wears out during the entire length of operation of the process, though that be years.

The giving of length to the annulus and limiting its thickness to a reasonable value, possibly 6 inches to 2 feet, is for the purpose of securing uniform distribution of feed over the active surface.

Material in the annulus, of size anywhere in the product range (and the great majority of the material there is in that range) is, for the time being, acting as the mechanism of the process. Instead of having metallic stirring devices which will break, wear out, and cake up with carbon, the product itself is used which, being constantly renewed, cannot wear out, and has no up-keep, and to which it is the purpose that carbon shall cling. In effect, the first duty of this material is to reproduce itself and it does not get out into the world until it has done so.

The moving mass in the annulus of the present apparatus occupies at least 90° of its circumference. Especially at the inlet end, it may occupy nearly 180° so that some material is carried over the top of the annulus.

Throughout the specification and claims, where the word granule is employed, it is to be taken to mean a consolidated body of carbon black with density of 20 pounds or greater per cubic foot, a size 100 mesh or larger, though granules of any appreciable size which can be separated by mesh screens without brushing even though that size be smaller than 100 mesh are not to be excluded.

It is to be understood that the form of my invention, herewith shown and described, is to be taken as a preferred example of the same, and that various changes in shape, size, and arrangement of parts may be resorted to in the apparatus without departing from the spirit of the process or the apparatus for carrying forward the process or the scope of the subjoined claims.

I claim:

1. An apparatus for agglomerating flocculent dry carbon black into carbon black granules which comprises a pair of concentric cylindrical members spaced from each other to form an annular passage therebetween and having common end walls, spaced inlets to the annular passage along the length of the inner cylindrical member, depression cups attached to the outer surface of the outer concentric cylindrical member and fully covering openings therein, said openings spaced along the length of said outer cylindrical member, an outlet in one end wall of said annular passage and an inlet in the opposite end wall of said inner cylindrical member, and means for rotating the concentric cylindrical members.

2. An apparatus for agglomerating flocculent dry carbon black into carbon black granules which comprises a pair of concentric cylindrical members spaced from each other to form an annular passage therebetween and having common end walls, spaced inlets to the annular passage along the length of the inner cylindrical member, said inlets comprising openings in said cylindrical member and covered with open end dippers, said dippers being attached to the inside side wall of said inner cylindrical member, depression cups attached to the outer surface of the outer concentric cylindrical member and fully covering openings therein, said openings spaced along the length of said outer cylindrical member, an outlet in one end wall of said annular passage and an inlet in the opposite end wall of said inner cylindrical member, and means for rotating the concentric cylindrical members.

3. An apparatus for agglomerating flocculent dry carbon black into carbon black granules which comprises a pair of concentric cylindrical members spaced from each other to form an annular passage therebetween and having common end walls, spaced inlets to the annular passage arranged helically along the entire length of the inner cylindrical member, said inlets comprising openings in said cylindrical member and covered with open end dippers, said dippers being attached to the inside side wall of said inner cylindrical members; depression cups attached to the outer surface of the outer concentric cylindrical member and fully covering the openings therein, said openings spaced helically along the length of said outer cylindrical member; an inlet in one end wall of said inner cylindrical member and an outlet in the opposite end wall of said annular passage; and means for rotating the concentric cylindrical members.

4. An apparatus for agglomerating flocculent dry carbon black into carbon black granules which comprises a pair of concentric cylindrical members spaced from each other to form an annular passage therebetween and having common end walls, spaced inlets to the annular passage arranged helically along the entire length of the inner cylindrical member, said inlets comprising openings in said cylindrical member and covered with open end dippers, said dippers being attached to the inside side wall of said inner cylindrical member; depression cups attached to the outer surface of the outer concentric cylindrical member and fully covering the openings therein, said openings spaced helically along the length of said outer cylindrical member; an inlet in one end wall of said inner cylindrical member and an outlet in the opposite end wall of said annular passage; an apparatus outlet comprising a cylindrical member, the cylindrical side wall of which is essentially continuous with the outer concentric cylindrical member and having an end wall, and means within the cylindrical outlet member to scoop up the carbon black granules for discharge from the apparatus; and means for rotating the apparatus.

5. An apparatus for agglomerating flocculent dry carbon black into carbon black granules which comprises a pair of concentric cylindrical members spaced from each other to form an annular passage therebetween and having common end walls, granules of carbon black filling a portion of the space in the annulus, spaced inlets to the annular passage arranged helically along the entire length of the inner cylindrical member, said inlets comprising openings in said cylindrical member and covered with open end dippers, said dippers being attached to the inside side wall of said inner cylindrical member; depression cups attached to the outer surface of the outer concentric cylindrical member and fully covering the openings therein, said openings spaced helically along the length of said outer cylindrical member; an inlet in one end wall of said inner cylindrical member and an outlet in the opposite end wall of said annular passage; an apparatus outlet comprising a cylindrical member, the cylindrical side wall of which is essenitally continuous with the outer concentric cylindrical member and having an end wall, and means within the cylindrical outlet member to scoop up the carbon black granules for discharge from the apparatus; and means for rotating the apparatus.

SAMUEL C. CARNEY.